United States Patent [19]
Reichl et al.

[11] 4,147,401
[45] Apr. 3, 1979

[54] POLYGONAL MIRROR HOLDER AND DRIVE ASSEMBLY

[75] Inventors: Helmut Reichl, Herrsching; Ludwig Schmidt, Munich, both of Fed. Rep. of Germany

[73] Assignee: Siemens Aktiengesellschaft, Berlin & Munich, Fed. Rep. of Germany

[21] Appl. No.: 841,799

[22] Filed: Oct. 13, 1977

[30] Foreign Application Priority Data

Apr. 19, 1977 [DE] Fed. Rep. of Germany ....... 2717299

[51] Int. Cl.² ............................................. G02B 27/17
[52] U.S. Cl. ...................................... 350/6.8; 350/299
[58] Field of Search ................ 350/6.8, 6.7, 310, 299; 358/206; 352/108; 250/236

[56] References Cited
U.S. PATENT DOCUMENTS

| 2,010,411 | 8/1935 | Papst ...................... 358/206 |
| 3,772,464 | 11/1973 | Chan et al. ............................ 358/206 |
| 3,966,309 | 6/1976 | Mohler .................................. 350/310 |
| 4,047,793 | 9/1977 | Lang ....................................... 350/6.8 |

FOREIGN PATENT DOCUMENTS

639296 11/1936 Fed. Rep. of Germany ........... 358/206
881584 5/1953 Fed. Rep. of Germany ........... 350/310

*Primary Examiner*—Jon W. Henry
*Attorney, Agent, or Firm*—Hill, Gross, Simpson, Van Santen, Steadman, Chiara & Simpson

[57] ABSTRACT

An adjustable mounting and driving device is disclosed for a polygonal mirror to be mounted on a drive shaft. The mirror is held at an axial end in a cup shaped cavity in a holder having a central bore for receipt of the drive shaft. The bore has a drive shaft contact area which is relatively axially short allowing the housing to tilt on the drive shaft. A plate is fixably mounted on the drive shaft axially adjacent the holder and has a plurality of axially adjustable set screws engageable with a back wall of the holder to control tilt of the holder on the shaft. A resilient member between a front wall of the housing and an extension of the plate urges the housing into contact with the set screws and rotatably drives the mirror.

15 Claims, 4 Drawing Figures

POLYGONAL MIRROR HOLDER AND DRIVE ASSEMBLY

BACKGROUND OF THE INVENTION

1. Field of the Invention

This invention relates to devices for holding and driving polygonal mirrors useful in devices such as nonmechanical printers and where the polygonal mirror is adjustably mounted to a drive shaft to allow for deviations of alignment of the drive shaft.

2. Prior Art

Polygonal mirrors are frequently used in modern technology. One known such use is found in nonmechanical and noncontact printers. In such devices, with the help of a light beam played on a photodconductive drum surface, an electrical latent image can be created of an image to be reproduced. The latent image is developed through the use of toner which is thereafter transferred to a final image carrier, for example a sheet of paper. The toner on the sheet of paper can thereafter be fixed through the application of heat and/or pressure.

In such constructions, it is possible for a laser to serve as the source for the light beam. The laser beam is directed to an acousto-optical beam deflector which splits the light beam into a series of beams positioned vertically one above the other. The series of beams are then directed to a rotating polygonal mirror which reflects them in a horizontal direction onto the photoconductive drum surface. A known arrangement for creation of electrical latent images with the aid of light beams which makes use of a polygonal mirror in the above manner is shown, for example, in U.S. Pat. No. 4,019,186, the teachings of which are herein incorporated by reference.

Deflection of the light beams by the polygonal mirror must be extremely precisely controlled in order to make satisfactory image production possible. This means that the polygonal mirror must be precisely aligned in its drive mounting. Since the drive mounting itself is subject to alignment difficulties, it must be possible to compensate for all such deviations from the desired true running of the drive by some adjustment means which allows proper adjustment of the mirror.

SUMMARY OF THE INVENTION

It is therefore the intention of this invention to provide a solution to the above defined adjustment problem by providing a device for holding and driving a polygonal mirror which allows the polygonal mirror to be adjusted in its attitude so as to allow deviation in positioning of the mirror to compensate for deviations of the drive for the mirror from the desired true running drive position.

The problem is solved by this invention by use of a disc firmly affixed to the shaft of the drive, the disc having axially projecting adjusting screws or set screws. A mirror housing for the polygonal mirror is mounted on the drive shaft axially closely spaced to the disc in a manner allowing tilting of the housing with respect to the drive shaft. Finally a drive connection is provided through which the housing is resiliently urged against the adjusting screws of the disc such that the attitude of the mirror housing on the drive shaft is adjustable by variously projecting the adjusting screws from the disc.

In the preferred embodiment illustrated, the mirror housing can be constructed as a member having a cup shaped recess at one axial end in which the polygonal mirror is cemented and is centered therein at a juncture of its polygonal angles and the inner diameter wall of the cup shaped recess. In such a construction it is expedient to bevel the angles of the polygon slightly in order that the angles will provide a surface contact with the inner diameter of the recess.

In order to adjust the polygonal mirror relative to the drive shaft, in the preferred embodiment, the mirror housing is provided with a central bore through the back wall of the cup shaped recess, which central bore receives the drive shaft. The bore has an axially short drive shaft contact portion. Because of the axial shortness of the contact portion, the mirror housing can be tilted relative to the drive shaft.

The extent of tilting of the housing relative to the drive shaft is controlled by means of the adjustment screws. For example, it is preferable to provide three circumferentially spaced adjusting screws or abutment projections of which only two are adjustable for tilt control.

In the embodiment herein illustrated, the device which loads the mirror housing against the adjusting screws consists of a clamping ring which, through the intermediary of an elastic material, urges the mirror housing against the set screws. The clamping ring is affixed to the set screw carrying disc.

It is therefore a principle object of this invention to provide a polygonal mirror-drive shaft connection which allows adjustment of the attitude between the mirror and the shaft.

It is another, and more specific object of this invention to provide a device for attaching a rotatable polygonal mirror to a drive shaft by mounting the mirror on a housing member having a central aperture for receipt of the drive shaft, the drive shaft housing connection allowing tilting of the housing on the shaft, the shaft being provided with fixed radial projections having axial abutment projections adjustably carried thereby, the projections being engageable with the housing, and means operatively connected to the drive shaft resiliently urging the housing against the projections and providing a drive connection to the housing.

It is another specific object of this invention to provide an adjustable drive shaft mounting for a polygonal mirror which comprises a disc shaped mirror housing having front and rear radially extending axial end walls, the front axial end wall having a cup shaped recess therein, the polygonal mirror mounted in said cup shaped recess having contact between the mirror at the polygonal angles and the inner diameter wall of the recess, the polygonal angles being beveled to provide surface contact, the housing having a central bore therethrough, a drive shaft received in the bore having an axial relatively short contact between the bore wall and the drive shaft, the drive shaft being provided with a fixed radially projecting disc member having a plurality of axially adjusting set screws therein engageable with the rear wall of the housing, a clamping collar projecting axially from adjacent the outer diameter of the disc radially beyond the housing and having a radially inward projection overlapping a front surface of the housing, an elastomeric member positioned between the front surface of the housing and the overlap, and means acting on said elastomer to urge the housing into contact with the set screws and to provide a drive connection for the housing.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
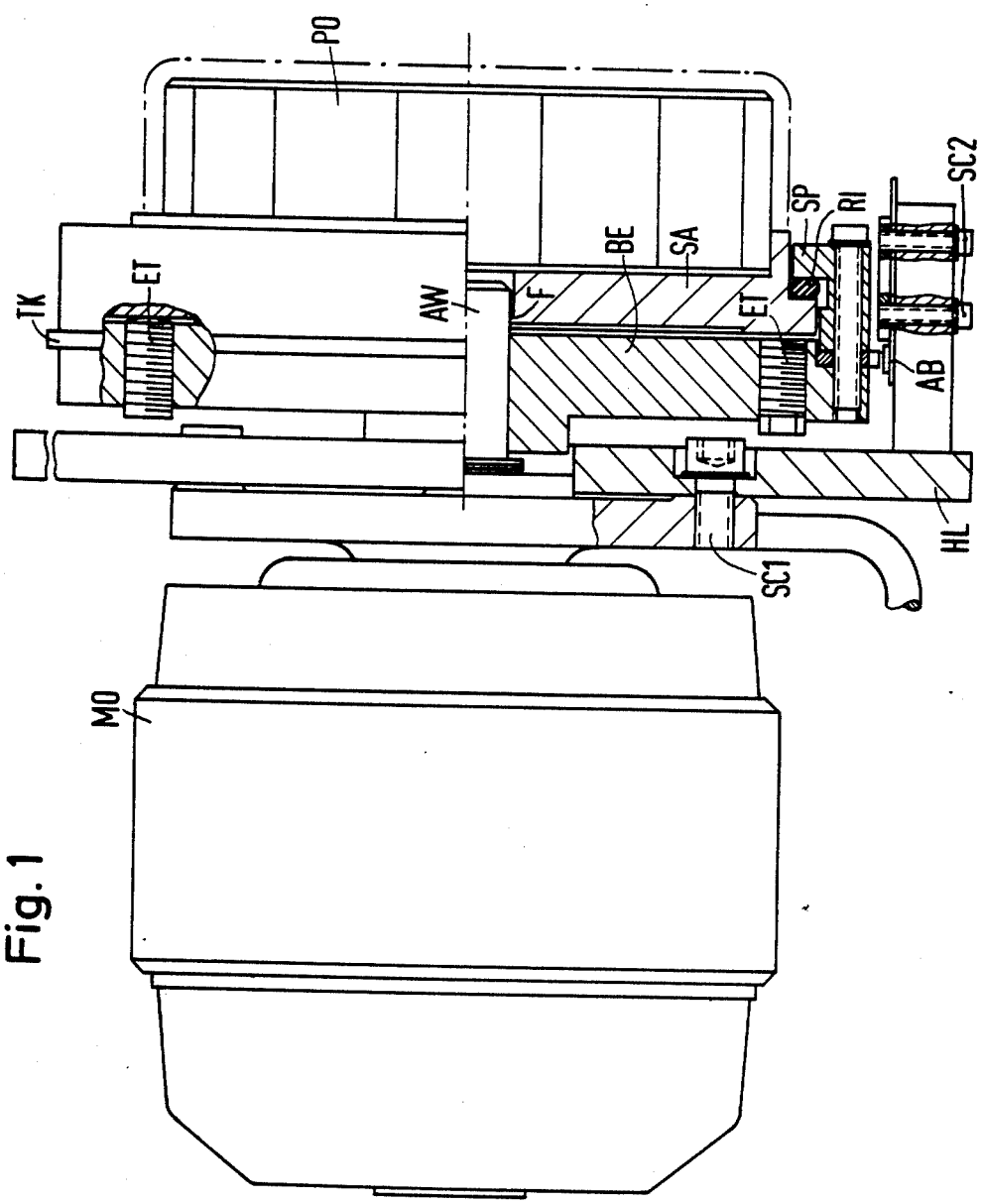
FIG. 1 is a side elevational view partially in section of a polygonal mirror mounting and drive assembly according to this invention.

As illustrated in FIG. 1, a polygonal mirror drive assembly includes a motor MO which is to rotatably drive a polygonal mirror PO. The motor MO is attached by means, such as screws SC1, to a mounting plate HL. The mounting plate can be, if desired, part of the casing. The drive shaft AW of the motor MO is firmly affixed to a radially projecting disc BE. The disc BE, can, for example, be cemented, welded, brazed, or otherwise permanently fixed to the drive shaft AW. The disc BE is provided with a plurality of axially extendable abutment projections or adjusting or set screws ET which are radially spaced from the shaft AW. The adjusting screws ET may, preferably, be three in number. The adjusting screws ET extend through the body of the disc BE and can be adjusted inwardly and outwardly by rotation in threaded bores through the disc BE.

In the preferred embodiment, a mirror housing SA is positioned on the drive shaft AW in close axial proximity to the disc BE. The mirror housing SA can thus be brought to lie against the axial ends of the screws ET.

The mirror housing SA is provided with a central bore ZT into which the driving shaft AW projects. The bore ZT has only a short axial drive shaft contact length F. The only direct contact between the mirror housing and the drive shaft AW is the axially short land F of the central bore ZT. As shown in the drawings, in order to provide the housing with a sufficient stability, the housing may be constructed as an axially longer disc such that the central bore ZT is considerably longer than the contact surface F. In such a construction the bore ZT may be stepped having an increased diameter section extending axially from the contact surface F, the diameter increase being such that the shaft AW does not contact the inner diameter surface of the diameter increased section of the bore even when the housing is tilted on the shaft to an attitude of other than 90° from shaft axis.

Figure 4:
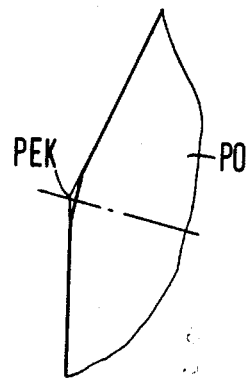
FIG. 4 is an enlarged fragmentary view illustrating the beveled polygonal angles of the mirror for example in the area B of FIG. 2.

The mirror housing has a front surface which is provided with a cup shaped recess into which the polygonal mirror PO is positioned. The mirror PO is centered in the housing SA by contacts between the mirror at the polygonal angles and the inner diameter surface of the cup shaped recess. In order to allow sufficient surface contact, it is expedient if the polygonal angles of the mirror are beveled, at least in that portion of their axial length which is received within the recess. The beveling can be obtained either by grinding or milling and can be a flat bevel or generated on a radius. Beveling of the angles is illustrated in FIG. 4 where the angle PEK of the mirror PO has been beveled on the outer surface of the mirror. FIG. 4 shows for example, an enlargement of the mirror angle in the area B of FIG. 2.

Figure 2:
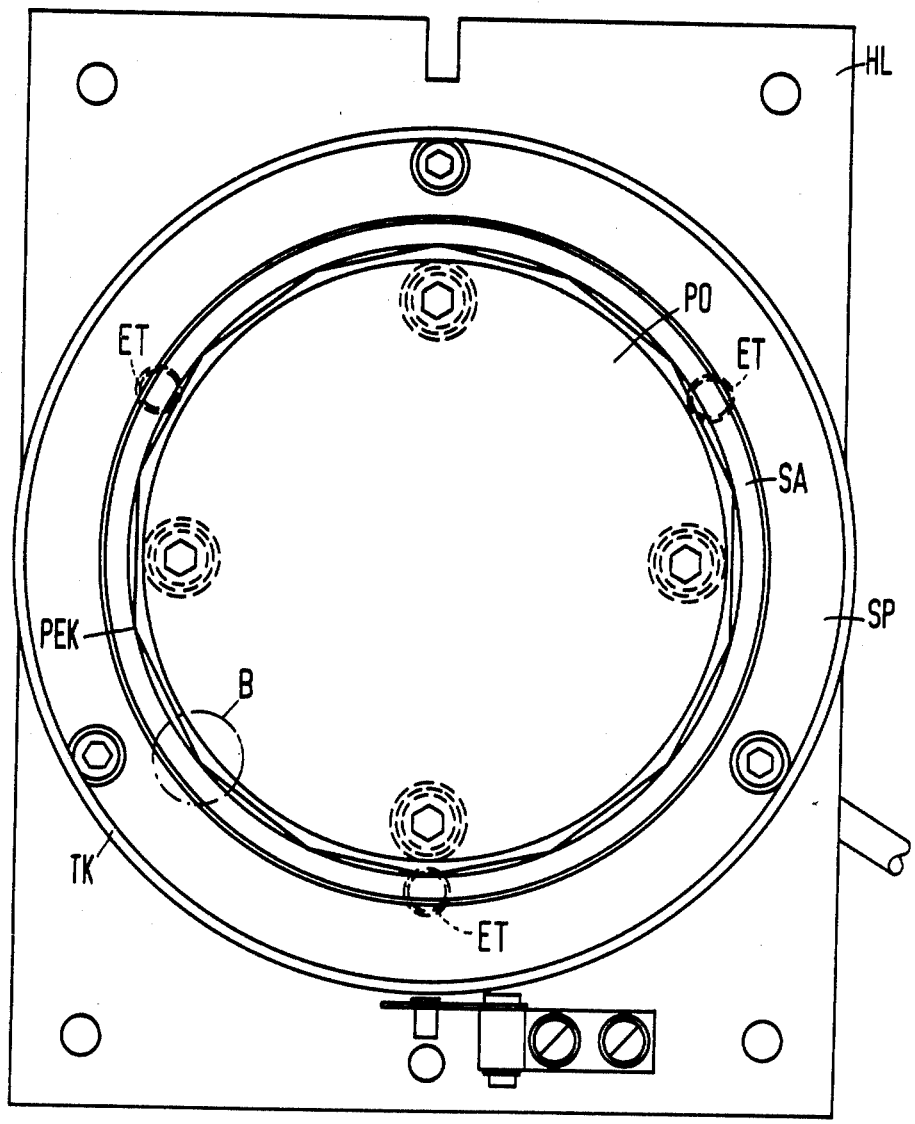
FIG. 2 is an end plan view of the device of FIG. 1 taken from the mirror end.

FIG. 2 illustrates the positioning of the mirror PO in the mirror housing and the formation and construction of the mirror insofar as it is pertinent to an understanding of this invention. The broken line above the polygonal mirror in FIG. 1 illustrates that a protective cap can be provided from the housing SA around the axially extending mirror portions to protect the mirror from dirt and foreign body contact.

Driving force from the motor shaft AW to the mirror housing SA is provided through a clamping ring SP and an interposed ring RI of elastomeric material. The ring RI is positioned between the clamping ring ST and a radially extending O.D. ledge of the mirror housing SA with the clamping ring SP and ledge being positioned in radially overlapping axially spaced positions spaced by the elastomeric ring RI. The clamping ring is preferably attached to the disc BE by means of bolts which, by being threaded into tapped bores in the disc BE can be screwed towards the disc to move the clamping ring SP to compress the elastomeric ring RI to urge the housing SA against the adjusting screws ET. Although an elastomeric ring RI is illustrated, it is to be understood that other resilient urging members can be utilized, for example coil or spiral springs, crenulated springs, pneumatic springs and the like.

It can therefore be seen that the position of the mirror housing SA on the drive shaft AW can be altered to provide for adjustment in the attitude of the mirror PO. Proper adjustment is provided by the adjusting screws ET. In the preferred embodiment, it is desired not to move one of the adjusting screws ET in order to prevent any undesired alteration in the axial positioning of the mirror PO. The tilt of the housing SA and therefore the mirror PO can be effected through the adjustment of two of three circumferentially spaced adjusting screws. Thus the mirror PO can be adjusted in relation to the driving shaft AW such that the light beams reflected from the mirror pass to the desired point of the photoconductive surface of the drum.

Figure 3:
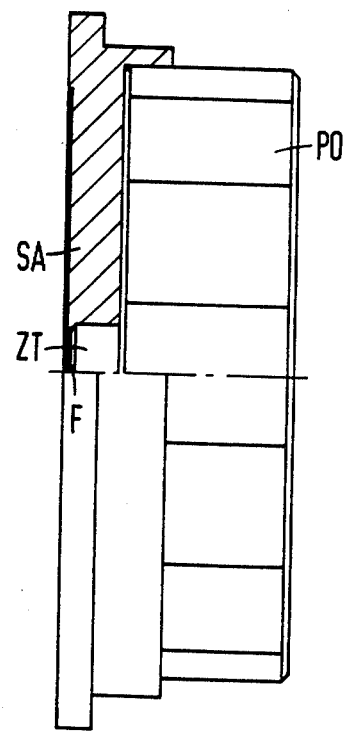
FIG. 3 is a side elevational view, partially in section, of the mirror and housing of this invention.

FIG. 3 illustrates, in more detail the construction of the mirror housing SA, the receipt of the mirror PO and the stepped geometry of the central bore ZT. As previously mentioned the central bore ZT has a shaft AW contact length F which is quite small, axially, in comparison to the length of the central bore ZT and the thickness of the housing SA. The zone of contact F constitutes a smaller diameter section of the overall bore ZT which has a diameter reduction such that the area F presents an inner diameter surface which will contact and ride on the shaft AW thereby controlling radial positioning of the housing SA. As illustrated, the step between the surface F and the major bore diameter may be chamfered and the surface may actually constitute a somewhat dulled knife edge if desired to facilitate tilting, it being understood however that the zone F may form a contact land controlling radial positioning of the housing. The diameter increase between the surface F and the remaining portion of the bore ZT should be such that even when the mirror housing SA is tilted relative to the drive shaft AW there will not be contact between the drive shaft and the large diameter portions of the bore.

As illustrated in FIG. 2, it is also possible, in this construction, to provide a speed sensor for sensing rotation of the mirror. An impulse disc TK is carried on the disc BE and held in place thereon through the clamping ring SP. The impulse disc TK is contacted or sensed by a probe AB which can be attached by means of screws SE2 to a bridge member attached to the member HL. Impulses furnished by the probe AB will therefore be seen to be dependent upon the speed of rotation of the mirror PO.

In the illustrated embodiment the shaft of the motor MO is illustrated as being the driving shaft AW. Of course it is to be recognized that the shaft AW does not have to be the motor shaft and can, for example be the shaft of a spindle assembly or other rotational drive member.

It can therefore be seen from the above that a particularly advantageous polygonal mirror to shaft fixture device is herein presented which is simply constructed but which makes possible a precise adjustment of the polygonal mirror with respect to the driving shaft therefore such that the attitude of the polygonal mirror PO is easily adjusted to allow for variations in the alignment and running positioning of the combination drive and mounting shaft for the mirror.

Although the teachings of our invention have herein been discussed with reference to specific theories and embodiments, it is to be understood that these are by way of illustration only and that others may wish to utilize our invention in different designs or applications.

We claim as our invention:

1. A device for holding and driving a polygonal mirror with which the polygonal mirror is adjustable such that deviations of the drive from true running can be compensated for comprising; a disc member rigidly connected to a driving shaft of a drive means, a plurality of adjusting means carried by the disc having axial ends projecting from an axial end face of the disc and at least some of the means being adjustable relative to the disc, a mirror housing holding the polygonal mirror, the mirror housing positioned on the drive shaft adjacent the disc, means resiliently loading the mirror housing against the ends of adjusting means of the disc, the mirror housing being tiltable relative to the driving shaft whereby the attitude of the mirror housing relative to the driving shaft is adjustable by means of the adjusting means, the mirror housing having a central axial bore extending therethrough for receipt of the driving shaft, the bore having a short reduced diameter axial shaft contacting surface allowing the mirror housing to tilt on the drive shaft while remaining concentric therewith.

2. The device of claim 1 wherein the mirror housing has a cup shaped recess in an axial face thereof, the polygonal mirror centered in the cup shaped recess and attached thereto by its polygon angle edges contacting the inner diameter of the cup shaped recess.

3. The device of claim 2 wherein the polygon angle edges of the mirror are beveled.

4. The device of claim 2 wherein three adjusting means are provided, two of which are screws movable for adjustment.

5. The device of claim 2 wherein a clamping ring carried by the disc has a portion radially overlapping a portion of the mirror housing, a spring means interposed between the clamping ring portion and the mirror housing portion, the clamping ring being bolted onto the disc in such a manner whereby tightening of the bolts will load the resilient means urging the housing against the adjusting screws.

6. The device according to claim 5 wherein an impulse disc is fixed to the disc, rotation of the impulse disc being read by a stationary probe.

7. The device of claim 5 wherein the mirror housing has a cup shaped recess in an axial face thereof, and the polygonal mirror is centered in the cup shaped recess and attached thereto by its polygon angle edge contacting the inner diameter of the cup shaped recess.

8. The device of claim 7 wherein the polygon angle edges of the mirror are beveled.

9. The device of claim 5 wherein the spring means is a ring of elastomeric material and wherein the disc has portions thereof extending radially beyond portions of the housing, the bolts connecting a clamping ring positioned in overlapping relation to a front axial end portion of the housing to the disc, the disc being positioned adjacent a rear axial end face of the housing.

10. A device for adjustably mounting a polygonal mirror on a drive shaft which comprises an adjusting member rigidly mounted on said shaft having first radially projecting wall portions, a polygonal mirror carrying housing mounted on said shaft axially adjacent said member having second radially projecting wall portions in opposition to said first radially projecting wall portions, a mirror carried by the housing projecting axially thereof, said mounting of the mirror housing allowing said housing to tilt relative to said shaft, a plurality of abutment members projecting from said adjusting member into contact with said housing at points radially spaced from the shaft, the degree of projection of at least some of the abutment members being adjustable to control tilt of the housing on the shaft, and means urging the housing against the abutment members, the mirror carrying housing having an axial bore therethrough for receipt of the shaft, the housing mounted on the shaft at the bore, the bore having a reduced diameter portion contacting the shaft, the reduced diameter portion having a short axial length allowing the housing to tilt on the shaft while remaining concentric therewith.

11. The device of claim 10 wherein some of the abutment members constitute threaded screws received in threaded bores through the disc, three such members being provided, two of which are axially adjustable screws.

12. The device of claim 10 wherein the disc has portions thereof radially extending beyond portions of the housing, a clamping ring carried by said disc, said clamping ring having a radially inwardly extending projection radially overlying an axial end face portion of the housing on a front axial face of said housing, the disc being positioned adjacent a rear axial face of said housing, the positioning of the overlapping portion of the clamping ring being axially adjustable towards and away from said disc, a resilient means being interposed between said overlapping portions of said clamping ring and said axial end face portion of said housing, whereby axial movement of the clamping ring towards the disc will compress the resilient means urging the housing against the abutment members, the abutment members being carried by said disc projecting axially therefrom radially inwardly of the clamping ring.

13. The device of claim 12 wherein the housing has a cup shaped recess in its axial front face, the recess having an inner diameter wall substantially equal to the outer diameter dimension of the polygonal mirror at the polygonal angle edges thereof, said mirror being attached to and centered on said housing by contact between the mirror at the polygonal angle edges and the inner diameter of the recess.

14. The device of claim 13 wherein the polygonal angle edges of the mirror are beveled at the points of the contact with the inner diameter of the cup shaped recesss providing area contact between the mirror and inner diameter.

15. The device of claim 14 wherein the cup shaped recess has an axial depth less than the axial length of the polygonal mirror.

* * * * *